US006220959B1

(12) United States Patent
Holmes, Jr. et al.

(10) Patent No.: US 6,220,959 B1
(45) Date of Patent: Apr. 24, 2001

(54) FLOATER BONUS POKER

(76) Inventors: Verne F. Holmes, Jr., 8625 Rosada Way, Las Vegas, NV (US) 89121; Alexander Stefan, 216 E. Arby Ave., Las Vegas, NV (US) 89119

(*) Notice: Subject to any disclaimer, the term of this patent is extended or adjusted under 35 U.S.C. 154(b) by 0 days.

(21) Appl. No.: 09/418,691

(22) Filed: Oct. 14, 1999

Related U.S. Application Data

(60) Provisional application No. 60/104,412, filed on Oct. 15, 1998.

(51) Int. Cl.[7] ...... A63F 13/00

(52) U.S. Cl. ...... 463/13; 463/12; 463/19; 463/20; 273/292

(58) Field of Search ...... 273/292, 274, 273/309; 463/12, 13, 19, 20

(56) References Cited

U.S. PATENT DOCUMENTS

| | | | | |
|---|---|---|---|---|
| 5,732,950 | * | 3/1998 | Moody | 273/292 |
| 5,803,809 | * | 12/1999 | Yoseloff | 463/13 |
| 5,816,916 | * | 10/1998 | Moody | 463/13 |
| 5,823,873 | * | 10/1998 | Moody | 463/13 |
| 5,882,259 | * | 3/1999 | Holmes et al. | 463/13 |
| 5,957,774 | * | 9/1999 | Holmes et al. | 463/13 |
| 5,971,849 | * | 10/1999 | Falciglia | 463/16 |
| 5,976,016 | * | 11/1999 | Moody et al. | 463/13 |
| 6,007,066 | * | 12/1999 | Moody | 273/292 |
| 6,098,985 | * | 8/2000 | Moody | 273/292 |
| 6,120,378 | * | 9/2000 | Moody et al. | 463/20 |

* cited by examiner

*Primary Examiner*—Steven Wong
*Assistant Examiner*—Dolores R. Collins
(74) *Attorney, Agent, or Firm*—John Edward Roethel

(57) ABSTRACT

An electronic video gaming machine is programmed to play a multi-hand video poker game which initially displays to the player a five-by-five matrix of twenty-five cards. This five-by-five matrix generates twelve five card hands—the five horizontal rows, the five vertical columns and the two diagonals. The player makes a wager of fifty credits which makes the player eligible for all twelve hands, with five credits applied to each hand, in effect given the player two free hands at five credits each. Five separate decks of playing cards are used with the five cards in each horizontal row being dealt from a separate deck of cards. The player may select one card from each horizontal row to be held and the selected card is also duplicated into an adjacent row location in that row. Replacement cards for the discarded cards are dealt into each horizontal row. Each of the twelve different five card hands are analyzed to determine its poker hand ranking and winning hands are paid in accordance with a pay table. The suits of the cards can be ignored in the analysis of the hands. This eliminates the need to consider any flush card combinations and simplifies the pay table.

11 Claims, 10 Drawing Sheets

FLOATER BONUS POKER

CROSS-REFERENCE TO RELATED APPLICATION

This application is based on Provisional Application Ser. No. 60/104, 412, filed Oct. 15, 1998, now pending.

This invention relates to a single player poker game, and more particularly to a single player poker game that can be played as an electronic video poker game and in which the player has the option to play twelve different poker hands for the price of making wagers equal to the traditional ten poker hand wagers.

BACKGROUND OF THE INVENTION

The traditional electronic video poker gaming machine is designed to replicate the play of a hand of poker. The player does not play against any other player's hands or against a dealer's hand; the player simply attempts to achieve the highest ranking poker hand possible from the cards displayed to the player on the display screen of an electronic gaming machine. The higher the ranking of the poker hand achieved by the player, the greater the player's winnings based on the number of coins, tokens or credits wagered by the player. Typically, a payout schedule is posted on the gaming machine to advise the player of the payoffs available for certain winning card combinations.

The first electronic video poker gaming machine displayed a simple game of video Draw Poker machine that was dealt from a standard 52 card poker deck and displayed a single five card hand to the player. The player then selected which of the five cards he wished to hold (or discard depending on the format of the gaming machine). The draw poker machine then displayed replacement cards for the cards the player discarded. The player won or lost based on conventional poker hand rankings for the resulting five card hand.

In conventional video Draw Poker, the conventional poker hand rankings that are winning combinations are a Royal Flush, 0o a Straight Flush, a Four of a Kind, a Full House, a Flush, a Straight, a Three of a Kind, a Two Pair and a Pair of Jacks of Better. Anything less than a Pair of Jacks of Better is typically a losing hand. A pay table for the winning hand combinations is established based on the number of coins, tokens or credits wagered by the player and the type of poker hand achieved.

The classic draw poker machine has been modified to use jokers as wild cards or to use deuces (or even other cards) as wild cards. "Joker's Wild" and "Deuces Wild" draw poker still display to the player a single five card hand and allow the player to discard unwanted cards and receive replacement cards. The payout table is modified to recognize the differing odds for achieving various poker hands when wild cards are involved. Furthermore, different poker hand rankings are used in the pay table to recognize different winning combinations that can be achieved using wild cards.

There have been modifications to the method of play of traditional single hand video draw poker. For example, many different types of pay tables have been developed to attract players and allow for higher payouts than were available in conventional draw poker. For example, Bonus Poker, Double Bonus Poker, Double-Double Bonus Poker and Triple Bonus Poker all provide relatively large payouts for the higher ranking poker hands while providing smaller payouts for the lower ranking poker hands.

Another variation of conventional video draw poker is a series of games that go under the common name of "Deal/

Draw" video poker games. "Deal/Draw" video poker games are disclosed and described in U.S. Pat. No. 5,882,259 and U.S. Pat. No. 5,957,774, the disclosures of which are incorporated herein by this reference.

In "Deal/Draw" video poker games, the player makes a single wager to be eligible to play the game. The player can win on the deal of the initial five card hand and also after the draw step of the method of play. This gives the player the opportunity to win twice on each play of a hand of cards.

Another variation of video draw poker is a video poker game known as "Triple Play Poker" which is described in U.S. Pat. No. 5,823,873, the disclosure of which is incorporated herein by this reference. In the method of play described in this patent, the player makes three separate wagers to play three different five card poker hands. A first five card hand is dealt from a first deck of playing cards. The player selects which of the first five cards he wishes to hold and these held cards are duplicated into the second and third hands. Replacement cards are dealt for the cards discarded from the first hand. From a second deck, cards are dealt to complete the second hand with five cards. From a third deck, cards are dealt to complete the third hand with five cards. Each hand is analyzed to determine its poker hand ranking and winning hands are paid according to the pay table.

Traditional five card draw video poker usually allowed the player to wager a maximum of five credits per hand. "Triple Play Poker" increases the maximum wager to fifteen credits (five credits on each hand) and thus increases the revenue handle of the gaming machine. There is a need in the video gaming machine market to increase the revenue handle of these games by allowing and encouraging players to increase the number of credits wagered on each hand.

It is an object of the present invention to provide a new form of video poker game that allows the player to wager up to fifty credits on each round of play and therefore increases the revenue handle of the game while at the same time offering the player an exciting game with many chances to achieve winning hands.

It is a feature of the present invention to provide a multi-hand screen display which initially displays to the player a five-by-five matrix of twenty-five cards. This five-by-five generates twelve five card hands—the five horizontal rows, the five vertical columns and the two diagonals. The cards in each horizontal row are dealt from a separate deck of cards. A player may select one card from each horizontal row to be held and this selected card is also duplicated into an adjacent row location in that row. Replacement cards for the discarded cards are dealt into each horizontal row. Each of the twelve different five card hands are analyzed for poker hand rankings and winning hands are paid in accordance with a pay table.

It is an alternative feature of the present invention to provide that the twelve different five cards are analyzed after the initial deal for winning hand combinations and to pay the player for those winning hand combinations prior to the commencement of the hold and draw step. This adds a "Deal/Draw" feature to the method of play of the present invention.

It is an advantage of the present invention that the player is given multiple possible winning hand combinations and, in effect, allows the player to play twelve hands for the traditional cost of ten hands.

Other objects, features and advantages of the present invention will become apparent from a consideration of the following detailed description.

SUMMARY OF THE INVENTION

An electronic video gaming machine is programmed to play a multi-hand video poker game which initially displays to the player a five-by-five matrix of twenty-five cards. This five-by-five matrix generates twelve five-card hands—the five horizontal rows, the five vertical columns and the two diagonals. The player makes a wager of fifty credits which makes the player eligible for all twelve hands, with five credits applied to each hand, in effect given the player two free hands at five credits each.

Five separate decks of playing cards are used with the five cards in each horizontal row each being dealt from one of the five separate decks of cards. The player may select one card from each horizontal row to be held and the selected card is also duplicated into an adjacent row location in that row. Replacement cards for the discarded cards are dealt into each horizontal row. Each of the twelve different five card hands are analyzed to determine its poker hand ranking and winning hands are paid in accordance with a pay table.

In an alternative embodiment, the twelve different five card hands are analyzed after the initial deal for winning hand combinations. The player is paid for those winning hand combinations that are achieved after the initial deal based on a separate pay table for this feature. This adds a "Deal/Draw" feature to the method of play of the present invention.

In the preferred embodiment of the present invention, the suits of the cards are ignored in the analysis of the hands. This eliminates the need to consider any flush card combinations and simplifies the pay table and the programming of the computer chip needed to operate the electronic gaming machine.

DETAILED DESCRIPTION OF THE PREFERRED EMBODIMENTS

An electronic video poker machine is programmed to display the method of the present invention. A video screen displays the cards dealt to the player and the player makes his selection of cards to hold by touching the card locations on the video screen using conventional touch screen technology. Alternatively, buttons to select the cards to be held may be provided on a conventional button panel.

Figure 1:
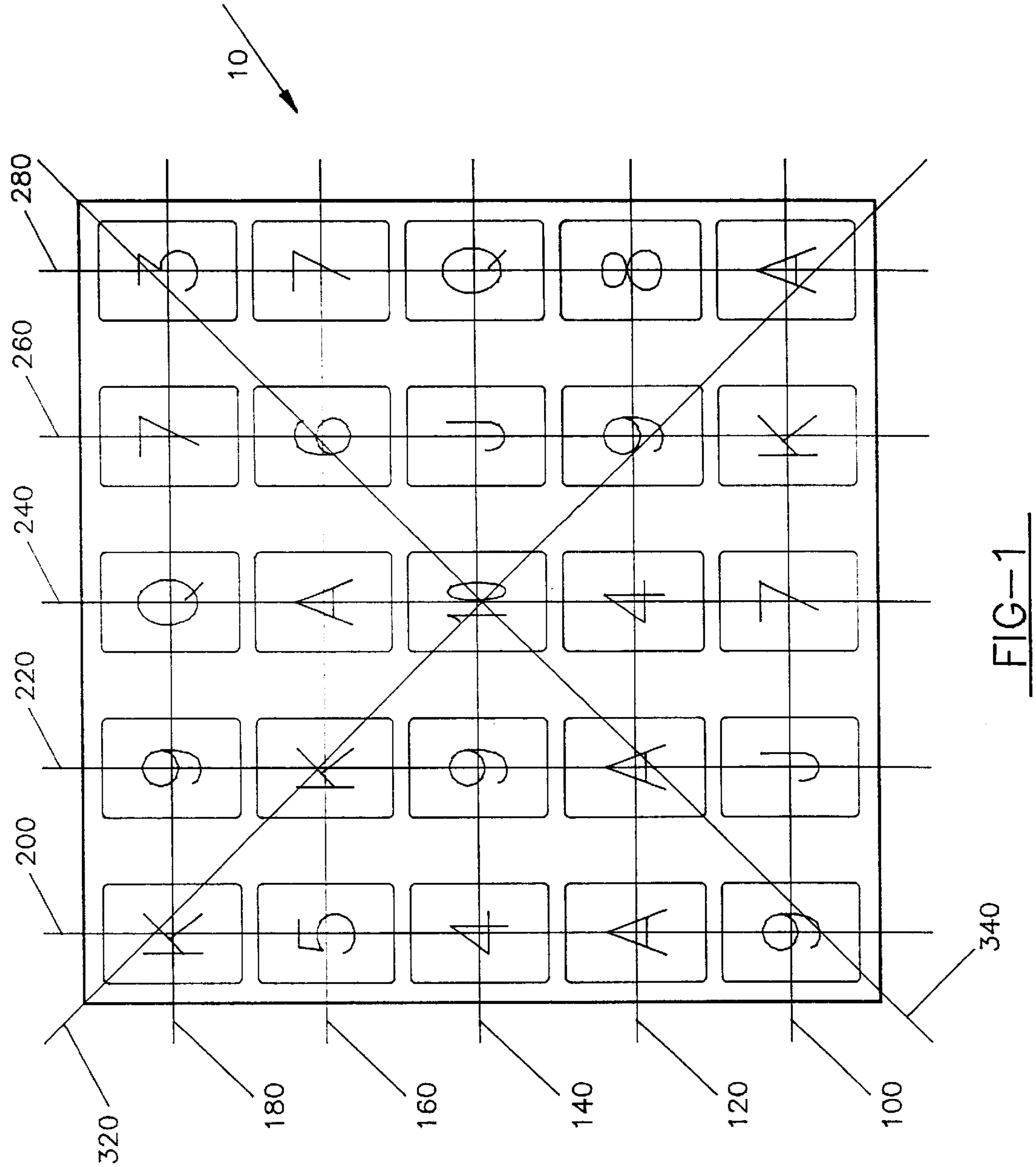
FIG. 1 is a typical screen display showing the game in idle state after a play of the method of the present invention has been completed.

When the player approaches the electronic video poker machine, the video display screen is in idle state and is displaying the results of the previously played game. This idle state condition is shown in FIG. 1. The video screen display 10 shows a five-by-five card matrix.

In the preferred embodiment of the present invention, twelve pay lines are provided so that the player has the opportunity to achieve winning card combinations along any or all of these twelve pay lines. As shown in FIG. 1, there are five pay lines 100, 120, 140, 160 and 180 along the horizontal rows; five pay lines 200, 220, 240, 260 and 280 along the vertical columns; and two pay lines 320 and 340 along the diagonals of the matrix.

A player makes a wager to activate each pay line on which the player wishes to be eligible to achieve a winning card combination. Any suitable wagering scheme can be used so that the player can wager any number of coins, tokens or credits on any one or more of the pay lines. But in the preferred embodiment of the present invention, the player would wager one to five coins, tokens or credits on each pay line. In the most preferred embodiment, the player would wager fifty coins, tokens or credits and the player would be allocated five credits on each of the twelve pay lines. In effect, the player is provided with two free pay line wagers because the player is given five credits on twelve pay lines for the actual cost of fifty coins, tokens or credits.

Figure 2:
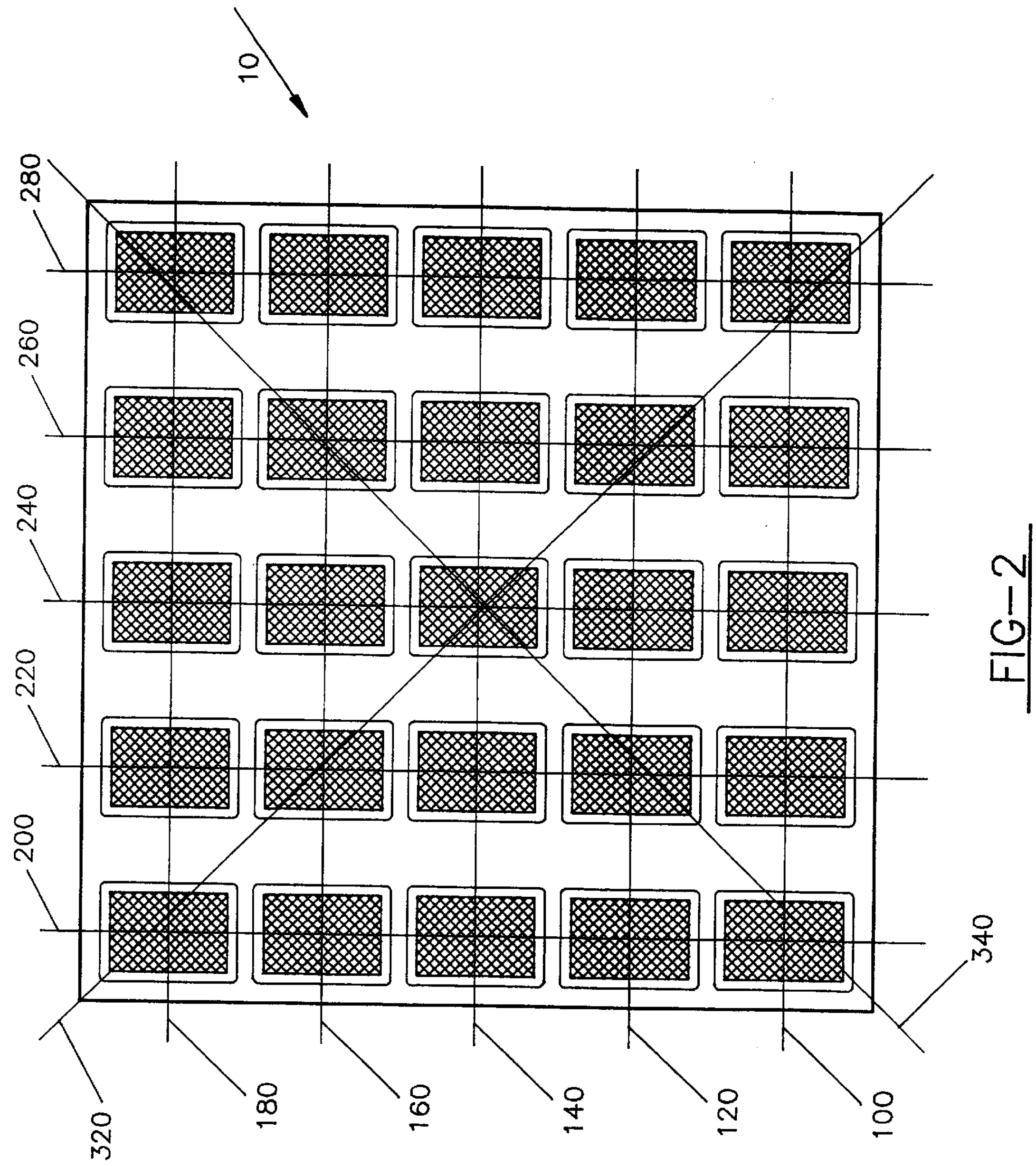
FIG. 2 is a screen display showing the method of play of the present invention after a wager has been made and before the initial deal of the cards.
Figure 3:
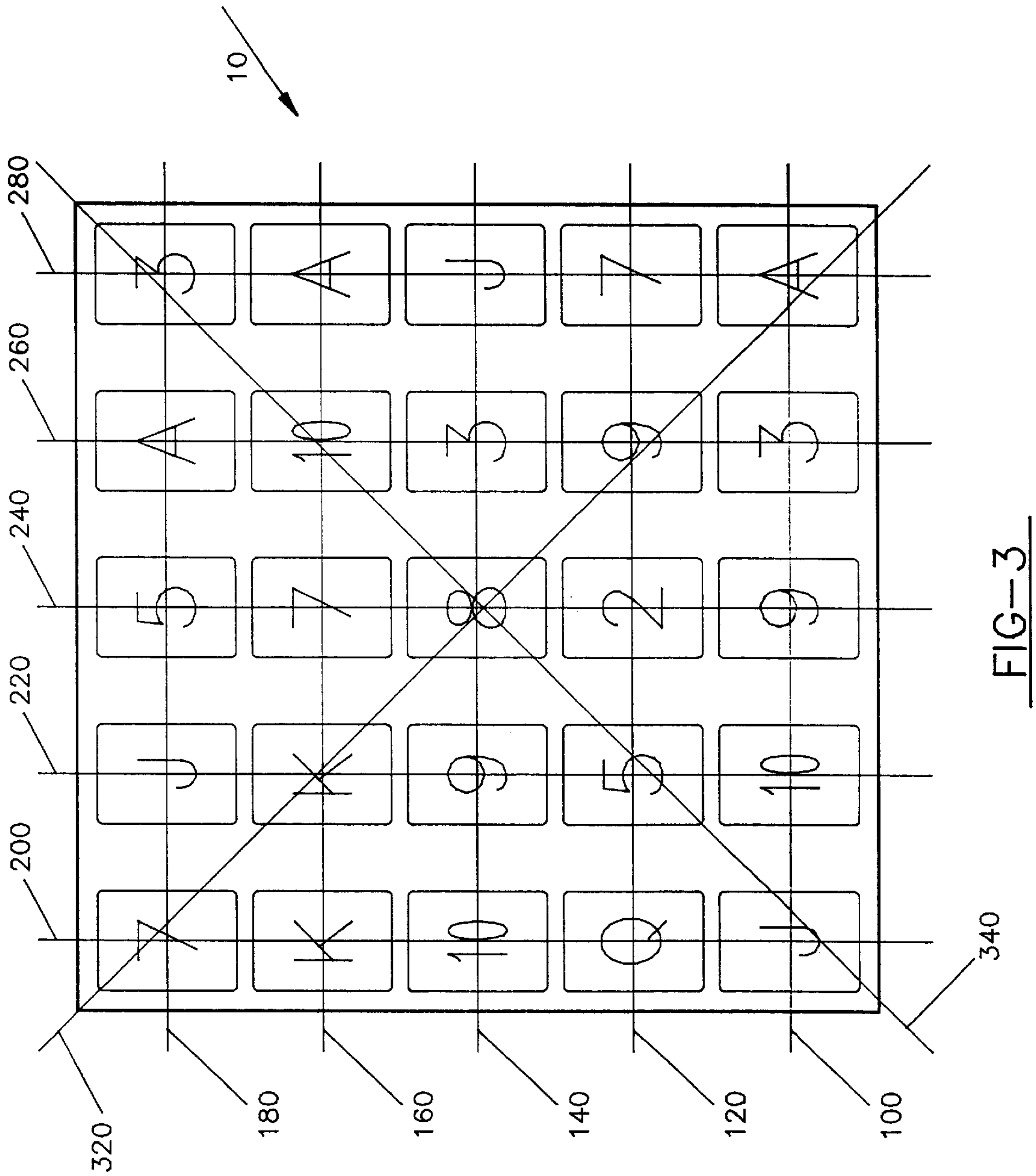
FIG. 3 is a screen display showing the method of play of the present invention after the initial deal of the cards.

When the player starts his wagering, the video screen display 10 converts to the display shown in FIG. 2. All twenty-five cards are displayed face down in the five-by-five matrix. When the player has completed his wagering and the cards have been electronically shuffled, the deal of the cards appears and all twenty-five cards are shown face up as shown in FIG. 3.

Any suitable manner of dealing can be provided. In one embodiment of the present invention, each horizontal row of cards is dealt from a separate deck of cards. Row 100 is dealt from deck A, row 120 is dealt from deck B, row 140 is dealt from deck C, row 160 is dealt from deck D and row 180 is dealt from deck E. Alternatively, all of the cards can be dealt from a single deck of cards or all of the cards can be dealt from two or more multiple decks of cards that have been all shuffled together.

The deck or decks of playing cards can be any suitable configuration of cards. In the preferred embodiment of the present invention, the deck can comprise a standard deck of fifty-two playing cards having the four traditional suits of cards (Spades, Hearts, Diamonds and Clubs).

In the most preferred embodiment of the present invention, the suits are not used in considering the poker hand rankings of the resulting five cards hands. Flushes, Straight Flushes and Royal Flushes are ignored; only Royal Straights (an Ace, King, Queen, Jack and Ten regardless of suit), Fives-of-a-Kind, Fours-of-a-Kind, Full Houses, Straights, Threes of a Kind, Two Pairs and Pairs of Jacks or Better are considered as winning card combinations. Thus the suits of the cards are not used, only the rank of the cards. Alternatively, other winning card combinations may be used and card combinations that use Royal Flushes, Straight Flushes and Flushes can also be included if desired.

One or more card ranks can be designated as wild cards as well as one or more Jokers can be added to the deck(s) and used as wild cards.

FIG. 3 shows a representative initial deal of the twenty-five cards using a separate deck of fifty-two playing cards for each horizontal row. Because the suits of the cards are ignored for the purposes of determining the poker hand ranking on each pay line, only the rank of the cards are shown in the drawings.

HAND ONE 100 is dealt from a first deck of cards and the player has been dealt a Jack, a Ten, a Nine, a Three and an Ace. HAND TWO 120 is dealt from a first deck of cards and the player has been dealt a Queen, a Five, a two, a Nine and a Seven. HAND THREE 140 is dealt from a first deck of cards and the player has been dealt a Ten, a Nine, an Eight, a Three and a Jack. HAND FOUR 160 is dealt from a first deck of cards and the player has been dealt a King, a King, a Seven, a Ten and an Ace. HAND FIVE 180 is dealt from a first deck of cards and the player has been dealt a Seven, a Jack, a Five, an Ace and a Three.

In this representative example, the player has wagered fifty credits. For the purposes of determining winning and losing hand combinations, the player is considered as having wagered five credits on each horizontal pay line 100, 120, 140, 160 and 180. The player is also considered as having wagered five credits on each vertical pay column, 200, 220, 240, 260 and 280. The player is also considered as having wagered five credits on each diagonal pay line 320 and 340. Therefore the player has been given, in effect, two free five credit wagers for his total wager of fifty credits.

In the preferred embodiment of the present invention, the player now selects one of the cards in each horizontal row to be held. Each card that is held by the player is duplicated once into an adjacent card position on the same row. In the most preferred embodiment, the player may only select as the card to be held and duplicated one of either an Ace, King, Queen, Jack or Ten.

Figure 4:
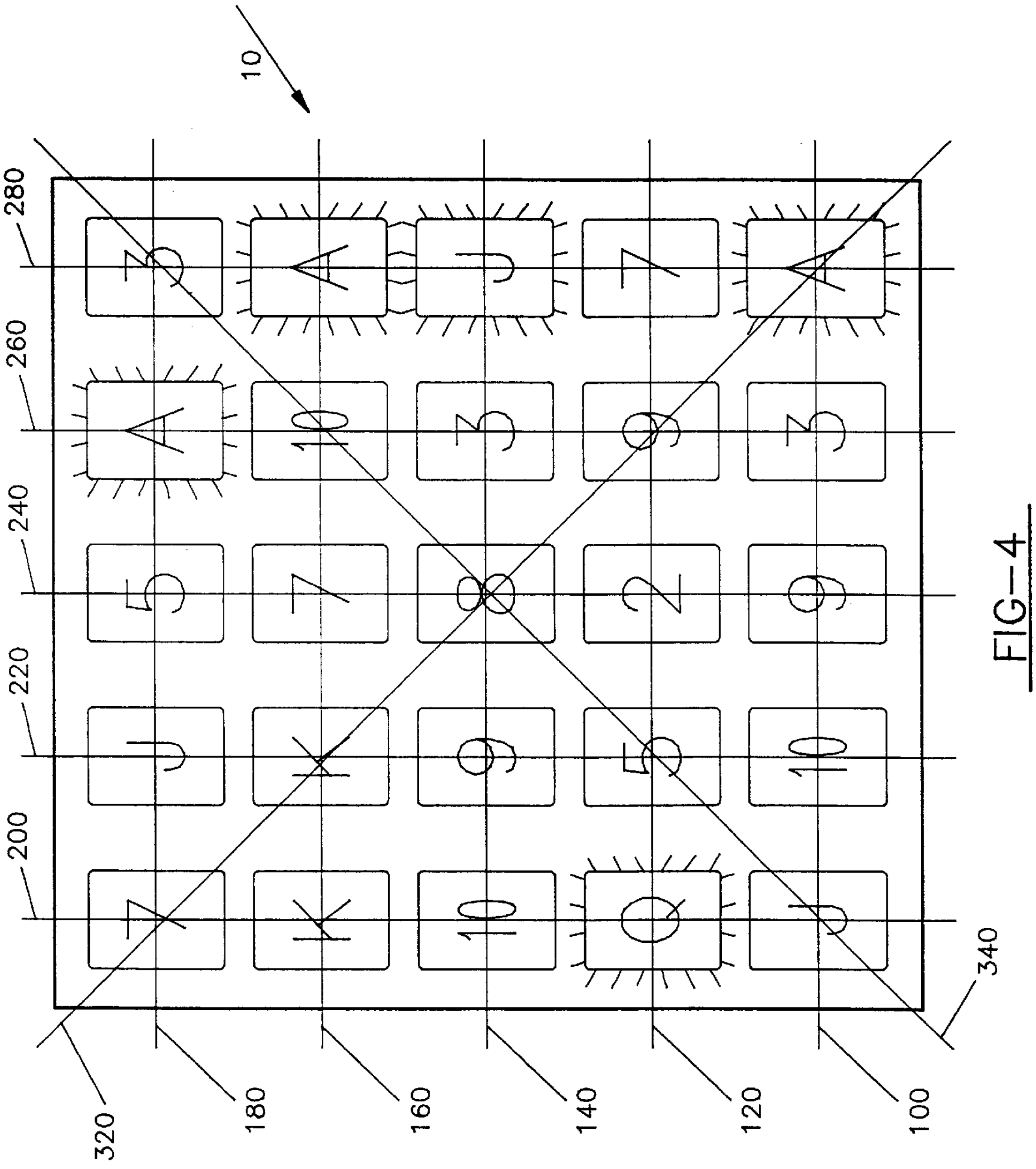
FIG. 4 is a screen display showing the method of play of the present invention after the player has selected one card from each row to be held.

FIG. 4 shows the cards that have been selected by the player to be held. In row 100, the player has selected an Ace. In row 120, the player has selected a Queen. In row 140, the player has selected a Jack. In row 160, the player has selected an Ace. In row 180, the player has selected an Ace.

Figure 5:
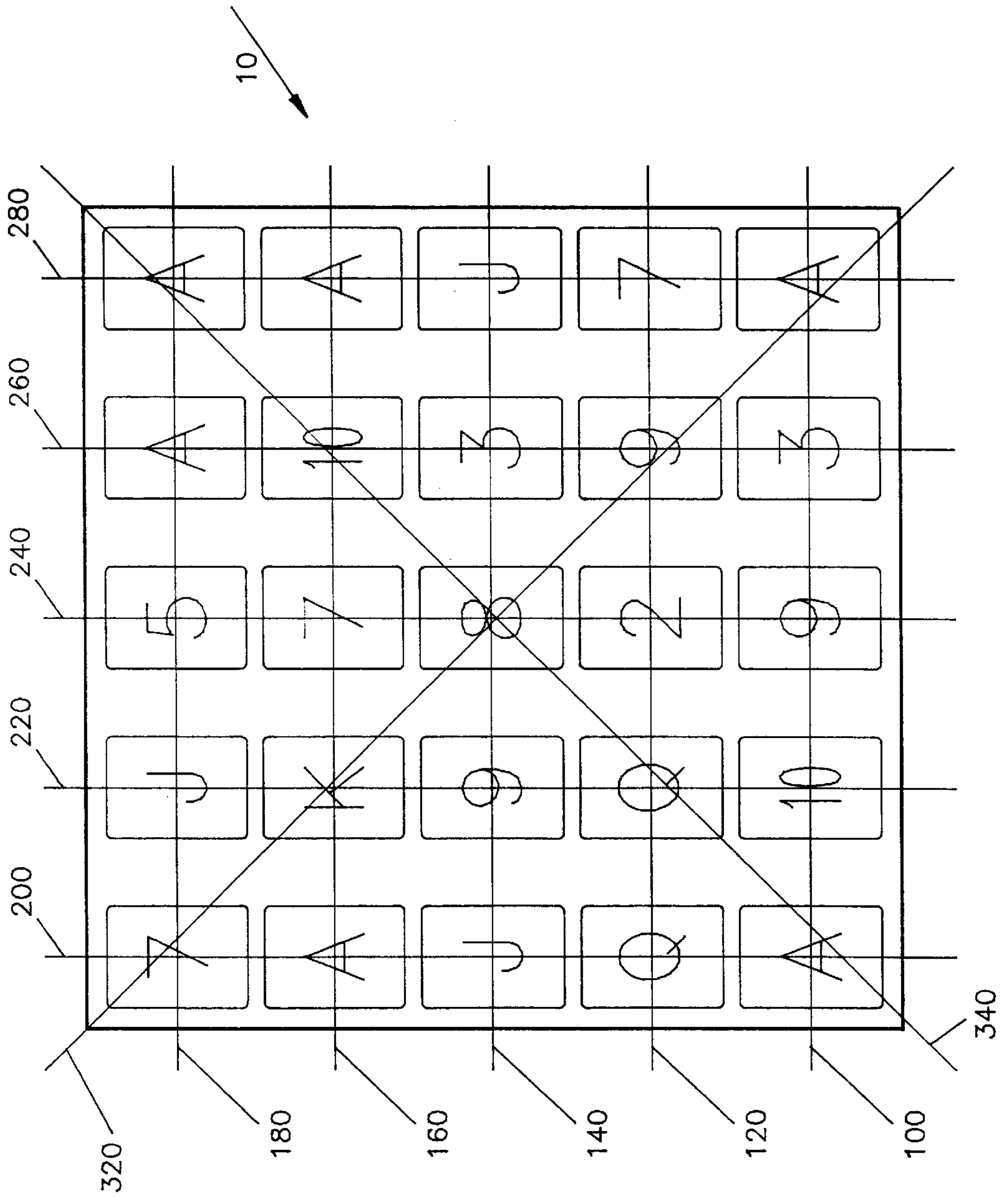
FIG. 5 is a screen display showing the method of play of the present invention after each card selected to be held by the player has been duplicated into an adjacent row position.

FIG. 5 shows the video screen display 10 after each card selected by the player has been duplicated into an adjacent card position next to the selected card. Row 100 now shows two Aces next to each other (when the card selected to be held is at the right end of a row, it is duplicated into the "adjacent" position at the beginning of the row). Row 120 shows two Queens next to each other. Row 140 shows two Jacks next to each other. Row 160 shows two Aces next to each other. Row 180 shows two Aces next to each other.

While the duplication of cards is effected in FIG. 5 by duplicating the card selected into an adjacent position to the right of the selected card, it is also possible to make the card duplication to the left of the selected card or into any other card position in the same row.

Figure 6:
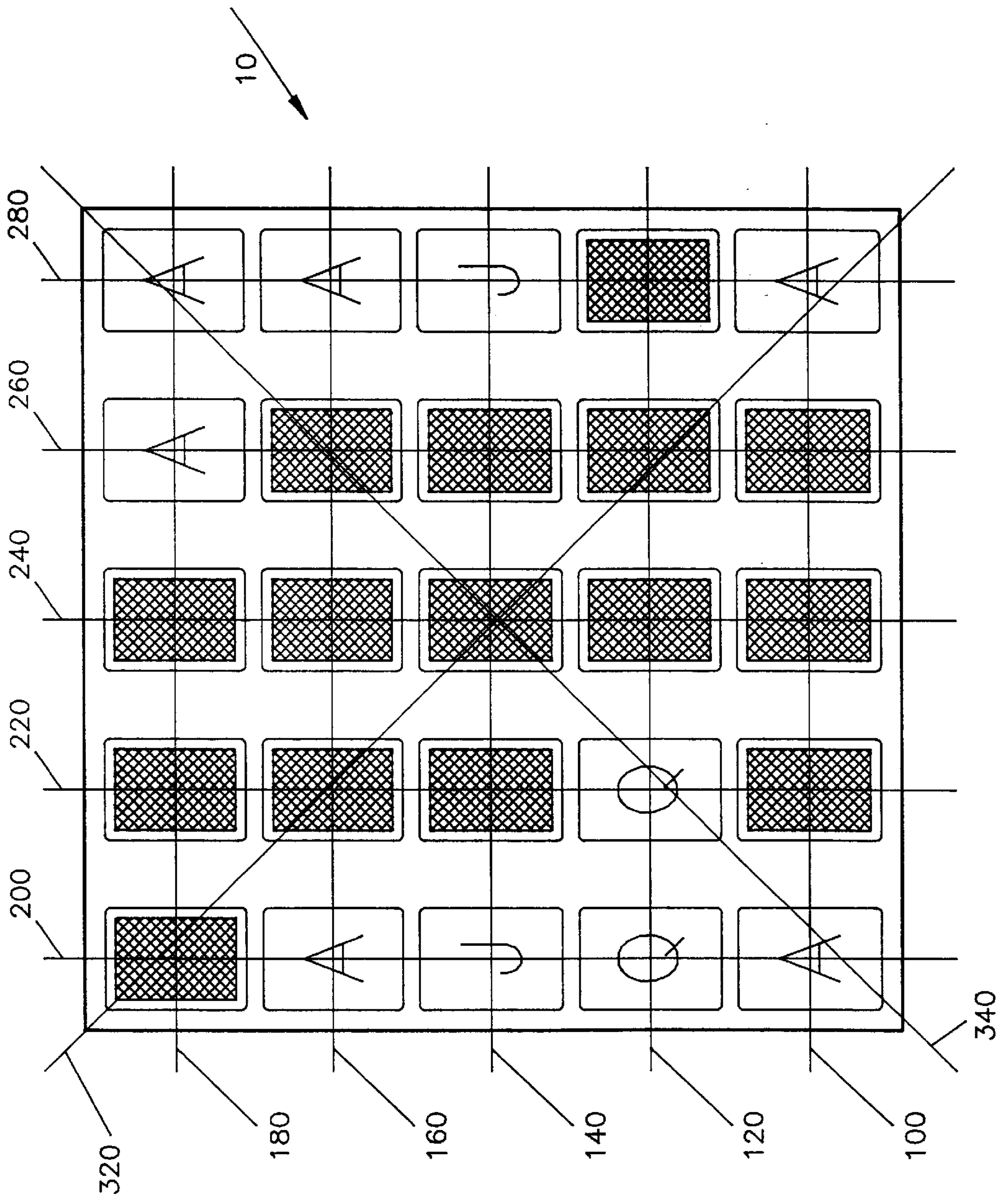
FIG. 6 is a screen display showing the method of play of the present invention after the selected cards have been duplicated into an adjacent row position and before replacement cards have been dealt.

After the card selection and duplication has occurred, the non-selected cards are discarded and replaced with new cards as shown in FIG. 6. The cards that have been replaced are shown face down in FIG. 6. The replacement cards are dealt from the same deck of cards that were used to deal the initial cards. In the embodiment in which each row is dealt from a separate deck of cards, the replacement cards are also dealt from the deck of cards that are associated with each row.

Figure 7:
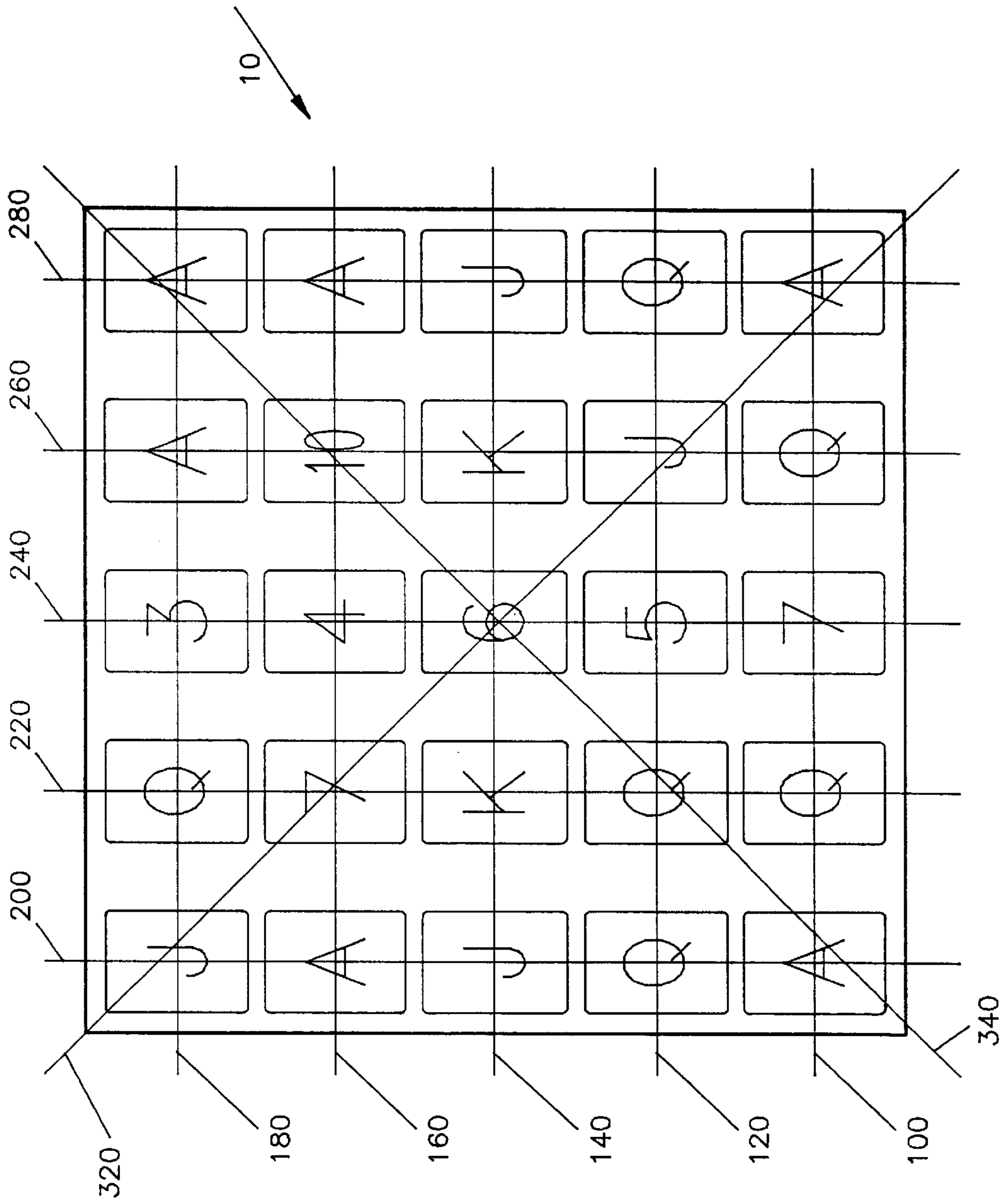
FIG. 7 is a screen display showing the method of play of the present invention after the replacement cards have been dealt into each row.

FIG. 7 shows the replacement cards being turned face up. These are the final twenty-five cards that are used to determine the winning and losing hand combinations that determine the outcome of this round of play. Each pay line that has been activated by the player is separately analyzed to determine the amount won or lost by the player.

Figure 8:
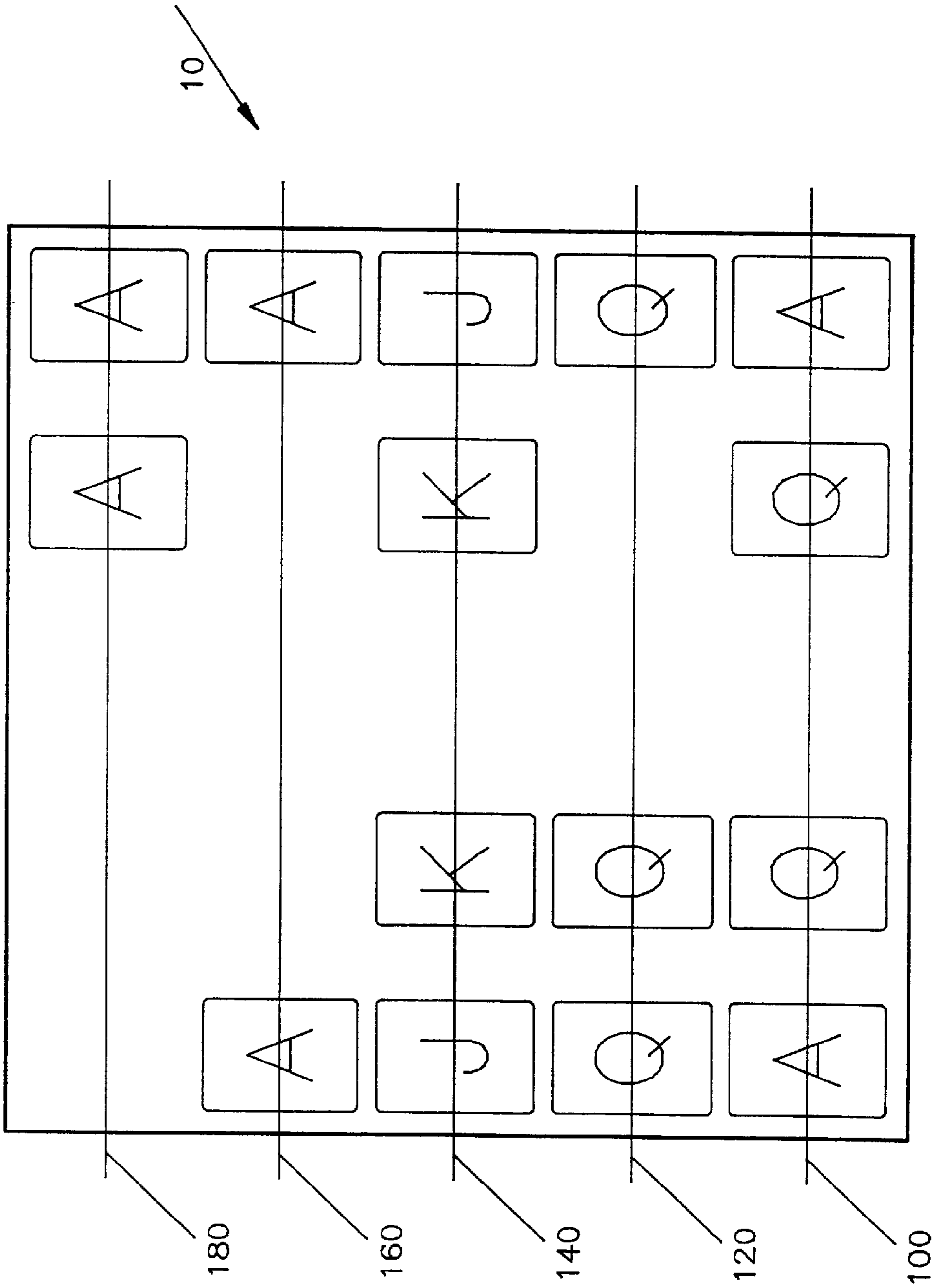
FIG. 8 is a screen display showing the method of play of the present invention with the winning card combinations on the horizontal rows highlighted.

FIG. 8 shows the results for the five horizontal pay lines. On row 100, the player has achieved two pair, Queens and Aces. On row 120, the player has achieved three-of-a-kind, Queens. On row 140, the player has achieved two pair, Jacks and Kings. On row 160, the player has achieved one pair, Aces. On row 180, the player has achieved one pair, Aces.

Figure 9:
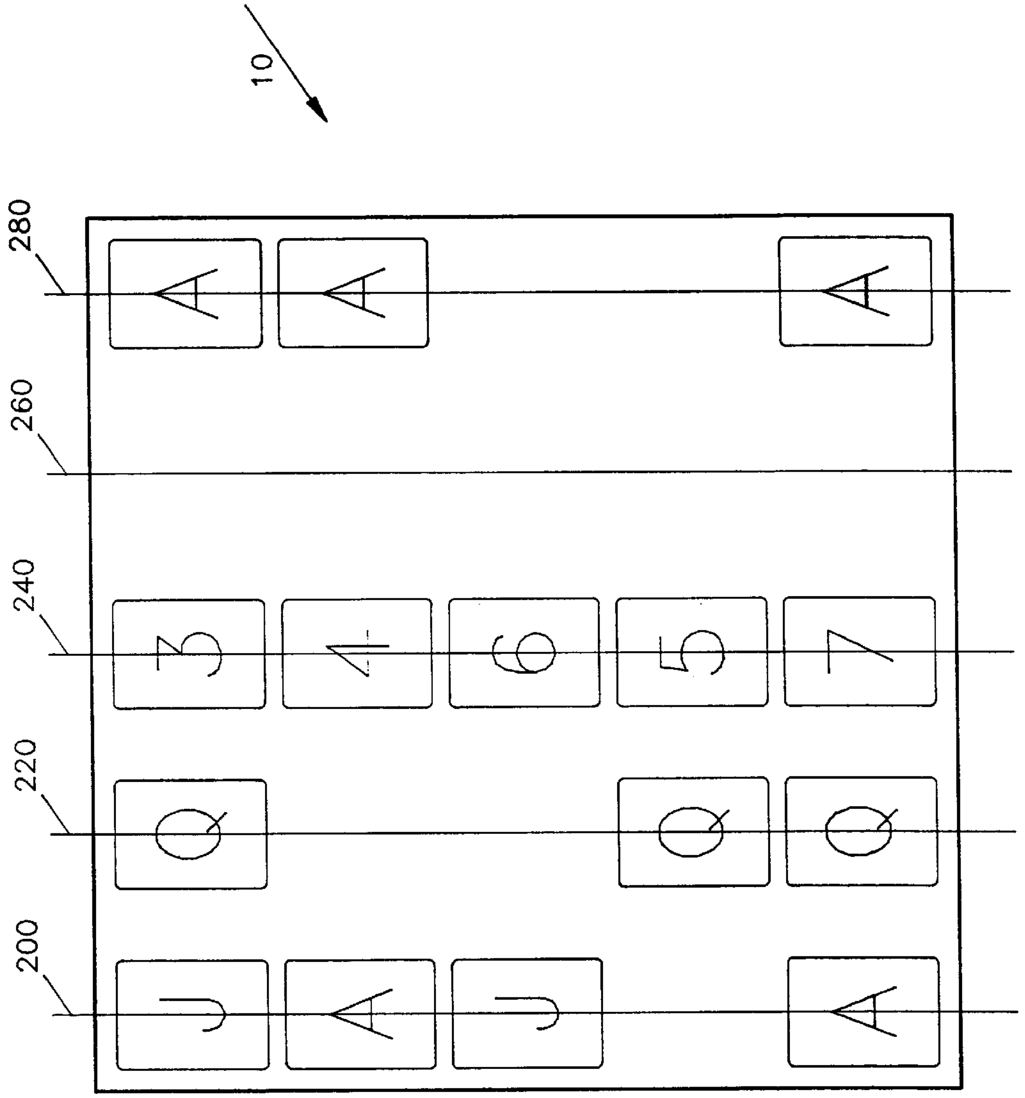
FIG. 9 is a screen display showing the method of play of the present invention with the winning card combinations on the vertical columns highlighted.

FIG. 9 shows the results for the five vertical pay lines. On column 200, the player has achieved two pair, Jacks and Aces. On column 220, the player has achieved three-of-a-kind, Queens. On column 240, the player has achieved a straight, Three through Seven. On column 260, the player has not achieved a winning card combination. On column 280, the player has achieved three-of-a-kind, Aces.

Figure 10:
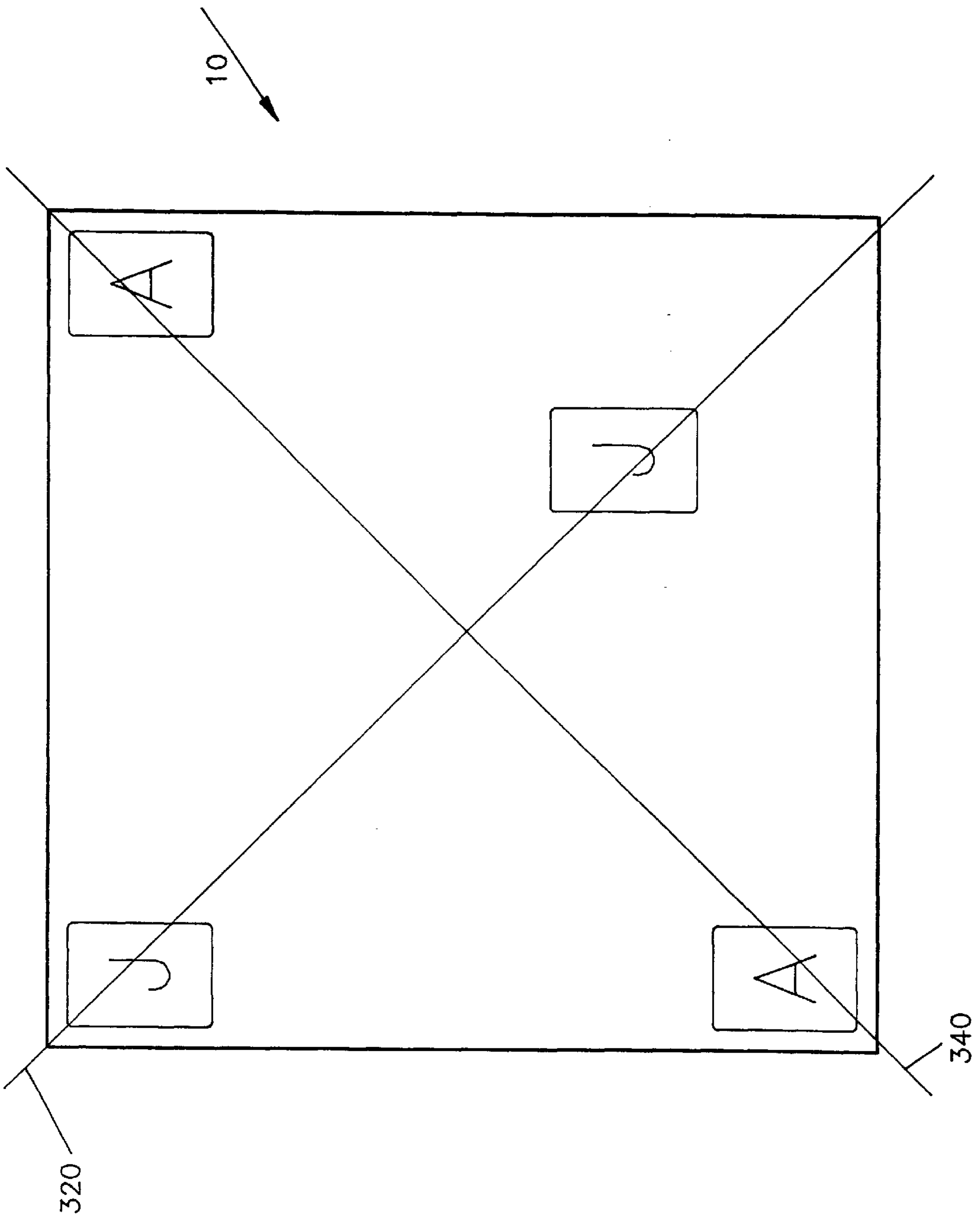
FIG. 10 is a screen display showing the method of play of the present invention with the winning card combinations on the diagonals highlighted.

FIG. 10 shows the results for two diagonal pay lines. On diagonal 320, the player has achieved one pair, Jacks. On diagonal 340, the player has achieved one pair, Aces.

Any suitable pay table can be used to reward the player for achieving various pay line card combinations. In the preferred embodiment of the present invention, a pay table as shown in Table 1 can be used.

TABLE 1

| POKER HAND (after the draw) | TIMES NUMBER OF COINS BET |
|---|---|
| ROYAL STRAIGHT | 250 |
| FIVE OF A KIND | 100 |
| FOUR OF A KIND | 50 |
| FULL HOUSE | 7 |
| STRAIGHT | 4 |
| THREE-OF-A-KIND | 2 |
| TWO PAIR | 1 |
| JACKS OR BETTER | 1 |

Alternatively, other payout tables can be utilized depending on the percentages the house wishes to retain.

The method of the present invention can also be modified to include a payout to the player based on the card combinations achieved by the player on the initial deal of the twenty-five card matrix, the "Deal/Draw" feature previously discussed. The player can win for achieving certain designated card combinations on the initial deal and the player may also win for achieving various winning card combinations after the draw round. This would give the player the opportunity to win twice on each round of play of the cards.

Any suitable pay table can be used to reward the player for achieving various pay line card combinations on this pay on the deal step. In the preferred embodiment of the present invention, a pay table as shown in Table 2 can be used.

TABLE 2

| POKER HAND (on the deal) | TIMES NUMBER OF COINS BET |
|---|---|
| ROYAL STRAIGHT | 500 |
| FIVE OF A KIND (FACE CARDS) | 200 |
| FOUR OF A KIND (FACE CARDS) | 100 |
| FULL HOUSE (FACE CARDS) | 50 |
| FIVE OF A KIND | 25 |
| FOUR OF A KIND | 15 |
| STRAIGHT (FACE CARDS) | 10 |
| THREE-OF-A-KIND (FACE CARDS) | 5 |
| TWO PAIR | 1 |
| JACKS OR BETTER | 1 |

Alternatively, other payout tables for the pay on the deal step can be utilized depending on the percentages the house wishes to retain.

While the invention has been illustrated with respect to several specific embodiments thereof, these embodiments should be considered as illustrative rather than limiting. Various modifications and additions may be made and will be apparent to those skilled in the art.

What is claimed is:

1. A method of playing a card game in which a player plays against a pay table and which uses one or more decks of standard fifty-two card playing cards in which the suits are not considered in determining winning card combinations and in which the winning card combinations comprise a Royal Straight, Five-of-a-Kind, a Four-of-a-Kind, a Full House, a Straight, a Three of a Kind, a Two Pair and a Pair of Jacks or Better comprising:

a) dealing a matrix of playing cards with five rows and five columns so that twelve resulting pay lines of five cards each are created comprising five horizontal pay lines consisting of the five rows, five vertical pay lines consisting of the five vertical columns and two diagonal paylines, the initial cards in each row being dealt from its own separate deck of cards;

b) the player selecting either no cards or one card in each row as cards to be held, c) each card selected to be held being duplicated and substituted for the card in an adjoining location in that row;

d) discarding all cards not held or duplicated and dealing replacement cards for the discarded cards, the replacement cards being dealt from the same deck as the initial cards;

e) after the replacement cards are dealt, determining the poker hand ranking of each of the twelve pay lines; and f) providing an award to the player for each winning card combination that has been achieved on each of the pay lines.

2. The method of claim 1 in which the player makes a wager on one or more of the pay lines and the player receives the award only on the pay lines on which the player has made a wager.

3. The method of claim 2 in which the amount of the award received by the player is based on a pay table.

4. The method of claim 3 in which the pay table comprises:

| POKER HAND (after the draw) | TIMES NUMBER OF COINS BET |
|---|---|
| ROYAL STRAIGHT | 250 |
| FIVE OF A KIND | 100 |
| FOUR OF A KIND | 50 |
| FULL HOUSE | 7 |
| STRAIGHT | 4 |
| THREE-OF-A-KIND | 2 |
| TWO PAIR | 1 |
| JACKS OR BETTER | 1 |

5. The method of claim 2 in which the player activates all twelve pay lines if the player makes wagers on ten pay lines.

6. A method of playing a card game in which a player plays against a pay table and which uses one or more decks of standard fifty-two card playing cards in which the suits are not considered in determining winning card combinations and in which the winning card combinations comprise a Royal Straight, Five-of-a-Kind, a Four-of-a-Kind, a Full House, a Straight, a Three of a Kind, a Two Pair and a Pair of Jacks or Better comprising:

a) dealing a matrix of playing cards with five rows and five columns so that twelve resulting pay lines of five cards each are created comprising five horizontal pay lines consisting of the five rows, five vertical pay lines consisting of the five vertical columns and two diagonal paylines, the initial cards in each row being dealt from its own separate deck of cards;

b) after the initial cards are dealt, determining the poker hand ranking of each of the twelve pay lines;

c) providing a first award to the player for each winning card combination that has been achieved on each of the pay lines;

d) the player selecting either no cards or one card in each row as cards to be held, e) each card selected to be held being duplicated and substituted for the card in an adjoining location in that row;

f) discarding all cards not held or duplicated and dealing replacement cards for the discarded cards, the replacement cards being dealt from the same deck as the initial cards;

g) after the replacement cards are dealt, determining the poker hand ranking of each of the twelve pay lines; and h) providing a second award to the player for each winning card combination that has been achieved on each of the pay lines.

7. The method of claim 6 in which the player makes a wager on one or more of the pay lines and the player receives the award only on the pay lines on which the player has made a wager.

8. The method of claim 7 in which the amount of the first award and the second award received by the player are based on a pay table.

9. The method of claim 8 in which the pay table for the first award comprises:

| POKER HAND (on the deal) | TIMES NUMBER OF COINS BET |
|---|---|
| ROYAL STRAIGHT | 500 |
| FIVE OF A KIND (FACE CARDS) | 200 |
| FOUR OF A KIND (FACE CARDS) | 100 |
| FULL HOUSE (FACE CARDS) | 50 |
| FIVE OF A KIND | 25 |
| FOUR OF A KIND | 15 |
| STRAIGHT (FACE CARDS) | 10 |
| THREE-OF-A-KIND (FACE CARDS) | 5 |
| TWO PAIR | 1 |
| JACKS OR BETTER | 1. |

10. The method of claim 8 in which the pay table for the second award comprises:

| POKER HAND (after the draw) | TIMES NUMBER OF COINS BET |
|---|---|
| ROYAL STRAIGHT | 250 |
| FIVE OF A KIND | 100 |
| FOUR OF A KIND | 50 |
| FULL HOUSE | 7 |
| STRAIGHT | 4 |
| THREE-OF-A-KIND | 2 |
| TWO PAIR | 1 |
| JACKS OR BETTER | 1. |

11. The method of claim 7 in which the player activates all twelve pay lines if the player makes wagers on ten pay lines.

* * * * *